United States Patent Office 2,704,285
Patented Mar. 15, 1955

2,704,285

2-AMINO-5-(LOWER ALKYL)-6-SUBSTITUTED PHENYL-4-PYRIMIDOLS

Kurt J. Rorig, Evanston, Ill., assignor to G. D. Searle & Co., Chicago, Ill., a corporation of Illinois No Drawing. Application June 17, 1954, Serial No. 437,563

8 Claims. (Cl. 260—256.4)

My invention relates to 6-hydroxyphenyl and 6-alkoxyphenyl substituted 2-amino-4-pyrimidol derivatives and salts thereof. The compounds which constitute my invention can be represented by the general structural formula

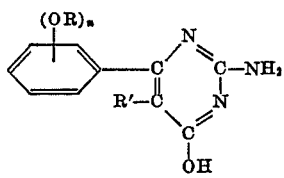

wherein R is either a hydrogen or methyl radical, R' is either hydrogen or a lower aliphatic hydrocarbon radical and n is either 1 or 2.

In the foregoing structural formula R' can represent hydrogen or a lower aliphatic hydrocarbon radical such as a lower alkyl radical, e. g. methyl, ethyl, straight-chain and branched propyl, butyl, amyl, and hexyl or a lower alkenyl radical, e. g. allyl, methallyl, crotyl, pentenyl, hexenyl and the like.

These compounds are active hypotensive agents and, in the case of the methyl esters, diuretics. They also have valuable cardioregulatory and adrenolytic properties.

The compounds of my invention are conveniently synthesized by the thermal condensation of a simple acid addition salt of guanidine with an ester of the structural formula

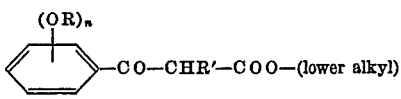

in a solvent such as a lower alkanol.

The aforementioned bases form salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids which provide anions which are non-toxic in therapeutic dosages. Among such esters are methyl chloride and bromide; ethyl chloride, propyl chloride, butyl chloride, isobutyl chloride, benzyl bromide, phenethyl bromide, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The following examples illustrate in further detail the compounds which constitute my invention and methods for their synthesis. However, my invention is not to be construed as limited in spirit or in scope by the details set forth therein. In these examples quantities of materials are indicated in parts by weight and pressures during vacuum distillations in millimeters (mm.) of mercury.

Example 1

In a reaction vessel equipped with a reflux condenser and a drying tube, a mixture of 118 parts of the ethyl ester of α-veratroylpropionic acid, 41.6 parts of quanidine carbonate and 220 parts of ethanol is stirred at reflux temperature for 10 hours, cooled and treated with solid carbon dioxide. A precipitate forms which is collected on a filter and washed with cold ethanol. The white crystals of 2-amino-5-methyl-6-(3',4'-dimethoxyphenyl)-4-pyrimidol thus obtained melt at about 288–289° C. The compound has the structural formula

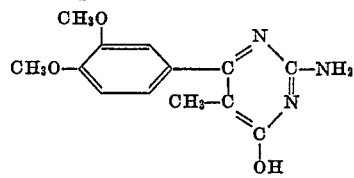

Example 2

A mixture of 50 parts of 2-amino-5-methyl-6-(3',4'-dimethoxyphenyl)-4-pyrimidol, 900 parts of 48% aqueous hydrobromic acid and 12.5 parts of 50% hypophosphorous acid is refluxed for 8 hours and then chilled. The precipitated hydrobromide is collected on a filter and the lustrous flakes are washed with a small amount of 48% aqueous hydrobromic acid and dried. An additional yield of 2-amino-5-methyl-6-(3',4'-dihydroxyphenyl)-4-pyrimidol is obtained by alkalinization of the mother liquor with ammonium hydroxide and collection of the resulting precipitate on a filter. The hydrobromide is dissolved in 1000 parts of ethanol, treated with 1 part of a 48% aqueous hydrobromic acid solution and 3000 parts of ether. The hydrobromide thus obtained sinters at about 190° C. and melts at about 267–268° C. It has the structural formula

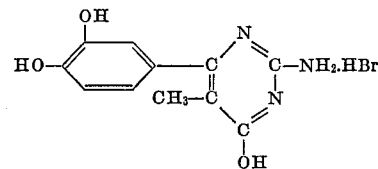

Example 3

Under anhydrous conditions a mixture of 17 parts of guanidine carbonate, 36 parts of the ethyl ester of 2-methoxybenzoylacetic acid and 1000 parts of ethanol is stirred and refluxed for 10 hours and then chilled and treated with solid carbon dioxide. The resulting precipitate is collected on a filter and the mother liquor is evaporated under vacuum to about one-third of its original volume and then diluted with 1500 parts of water. On cooling, an additional yield of the 2-amino-6-(2'-methoxyphenyl)-4-pyrimidol is obtained. After recrystallization from ethanol using charcoal decolorization, the compound forms white, high-melting needles.

Example 4

A mixture of 10 parts of 2-amino-6-(2'-methoxyphenyl)-4-pyrimidol, 100 parts of a 48% solution of hydrogen bromide and 3 parts of 50% hypophosphorous acid is refluxed for 6 hours and then chilled. The precipitated hydrobromide is collected on a filter, washed with a small amount of a 48% aqueous hydrogen bromide solution and dried. The mother liquor is made basic with ammonium hydroxide and the grayish precipitate is collected on a filter, dissolved in ethanol and treated with an excess of 48% hydrogen bromide to precipitate an additional quantity of the hydrobromide. The combined crops of the hydrobromide are stirred in ethanol and treated with a sufficient amount of ammonium hydroxide to render the solution basic. There is thus precipitated the high-melting 2-amino-6-(2'-hydroxyphenyl)-4-pyrimidol which has the structural formula

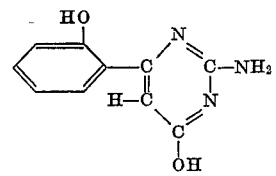

The same compound is obtained by reacting a mixture of 17 parts of guanidine carbonate, 35 parts of the ethyl ester of 2-hydroxybenzoylacetic acid and 80 parts of ethanol by the method of Example 3.

Example 5

To a solution of 23 parts of metallic sodium in 390 parts of ethanol, 222 parts of anisoylacetic acid are added. Under exclusion of moisture and with efficient stirring, the reaction mixture is maintained at gentle reflux while 178.5 parts of 1-iodopropane are added in the course of 20 minutes. After 7 additional hours of refluxing, the ethanol is removed under vacuum after which the residue is treated with 500 parts of water and 450 parts of benzene. The organic layer is separated, washed with water, dried over anhydrous calcium sulfate and evaporated. On vacuum distillation at 0.5 mm. pressure, the ethyl ester of α-anisoylpentanoic acid is collected at about 160–170° C. and 1.5–2 mm. pressure.

A mixture of 234 parts of the distillate, 83 parts of guanidine carbonate and 450 parts of ethanol is stirred and refluxed under anhydrous conditions for 10 hours, chilled and saturated with solid carbon dioxide. The resulting precipitate is collected on a filter, suspended in boiling water and chilled. There are thus obtained prismatic crystals of 2-amino-5-n-propyl-6-(4'-methoxyphenyl)-4-pyrimidol which has the structural formula.

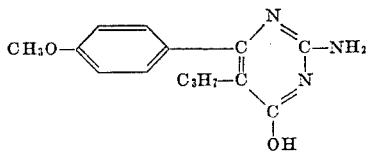

Example 6

A mixture of 20 parts of 2-amino-5-n-propyl-6-methoxyphenyl-4-pyrimidol, 140 parts of 48% aqueous hydrobromic acid and 5 parts of 50% hypophosphorous acid is refluxed for 9 hours and then cooled. An initial yield of the hydrobromide of 2-amino-5-n-propyl-6-(4'-hydroxyphenyl)-4-pyrimidol is thus obtained in flakes. These are washed with a small amount of ice cold 48% hydrobromic acid and dried. The filtrate is rendered alkaline by the addition of ammonium hydroxide and the resulting precipitate is stirred with ethanol and treated with an anhydrous stream of hydrogen chloride. After dilution with ether, the mixture is permitted to stand at room temperature. The hydrochloride is collected on a filter. It is further purified by recrystallization from ethanol and a large volume of ether. The compound melts above 260° C. after preliminary sintering. The hydrochloride has the structural formula

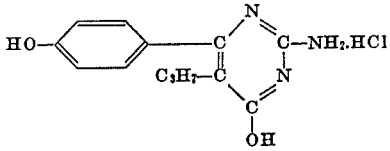

I claim:
1. A compound of the structural formula

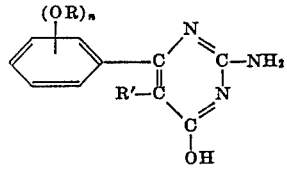

wherein R is a member of the class consisting of hydrogen and methyl radicals, R' is a member of the class consisting of hydrogen and lower alkyl radicals, and $n$ is a positive integer less than three.

2. A 2-amino-5-(lower alkyl)-6-hydroxyphenyl-4-pyrimidol.
3. A 2-amino-5-(lower alkyl)-6-dihydroxyphenyl-4-pyrimidol.
4. 2-amino-5-methyl-6-(3',4'-dihydroxyphenyl)-4-pyrimidol.
5. A 2-amino-5-(lower alkyl)-6-methoxyphenyl-4-pyrimidol.
6. A 2-amino-5-(lower alkyl)-6-dimethoxyphenyl-4-pyrimidol.
7. 2-amino-5-methyl-6-(3',4'-dimethoxyphenyl)-4-pyrimidol.
8. 2-amino-6-methoxyphenyl-4-pyrimidol.

No references cited.